(12) United States Patent　(10) Patent No.:　US 7,217,034 B2
Moshammer　(45) Date of Patent:　May 15, 2007

(54) PLAIN BEARING

(75) Inventor: Horst Moshammer, Linz am Rhein (DE)

(73) Assignee: Igus GmbH, Cologne (DE)

( * ) Notice: Subject to any disclaimer, the term of this patent is extended or adjusted under 35 U.S.C. 154(b) by 111 days.

(21) Appl. No.: 11/107,322

(22) Filed: Apr. 15, 2005

(65) Prior Publication Data

US 2006/0083447 A1　Apr. 20, 2006

(30) Foreign Application Priority Data

Oct. 15, 2004　(DE) .................. 20 2004 016 094 U (51) Int. Cl.
*F16C 29/02* (2006.01)

(52) U.S. Cl. .......................... 384/38; 384/42
(58) Field of Classification Search .................. 384/42, 384/41, 38, 26
See application file for complete search history.

(56) References Cited

U.S. PATENT DOCUMENTS 4,856,415 A * 8/1989 Noda ........................... 384/42
5,383,811 A * 1/1995 Campbell et al. ............. 384/42

* cited by examiner

*Primary Examiner*—Lenard A. Footiand
(74) *Attorney, Agent, or Firm*—Grossman Tucker Perreault & Pfleger, PLLC (57) ABSTRACT

A plain bearing for guiding a rail comprises a bearing housing (4) displaying a single, cylindrical through-opening (5), and a sliding element (6), which is supported in the through-opening (5) and which forms a sliding opening (7), in which the rail (2), by means of a rail head (9), is mounted in displaceable fashion, where the through-opening (5) and the sliding opening (7) are laterally open towards the outside at an angle μ formed by an engaging opening (10), through which the rail head (9) of the rail (2) can engage the sliding opening (7). To reduce wear and permit a low design height, the sliding opening (7) displays a polygonal cross-section, where at least one of the interior side surfaces (11) of the sliding element (6) that delimit the sliding opening (7) is essentially perpendicular to the greatest force expected during operation and transmitted via the sliding element (6) to the rail head (9).

10 Claims, 4 Drawing Sheets

PLAIN BEARING

The invention relates to a plain bearing for guiding a rail or the like, with a bearing housing displaying a single, cylindrical through-opening, and a sliding element which is supported in the through-opening and which at least partially delimits an interior sliding opening, which is positioned coaxially relative to the through-opening and in which the rail, by means of a rail head extending from a rail body and adapted to the sliding opening, is mounted in displaceable fashion, where the through-opening and the sliding opening are laterally open towards the outside at an angle μ formed by an engaging opening extending along their entire axial length, through which the rail head of the rail can engage the sliding opening.

Plain bearings of the type described in the opening paragraph are well known and are used, for example, in carriages that slide on rails to move loads along straight paths. In this context, the plain bearings should have the longest possible service life, which is determined in part by the friction forces and the wear between parts that undergo relative movement in the plain bearing. Furthermore, the plain bearings are required to generate as little noise as possible. In certain applications, such as spindle tables, it is further desirable for the plain bearings to have a low design height.

Therefore, the object of the invention is to provide a plain bearing of the type described in the opening paragraph, which improves the characteristics specified above.

According to the invention, the object is solved in that the sliding opening displays a polygonal cross-section, where at least one of the interior side surfaces of the sliding element that delimit the sliding opening and are designed as locating surfaces is essentially perpendicular to the greatest force expected during operation and transmitted via the sliding element to the rail head.

In this context, the sliding element is mounted in the through-opening such that it can rotate, but not be displaced axially. The opening angle is defined as the angle between the lines running radially from the longitudinal axis of the through-opening to the respective side flanks of the engaging opening. The polygonal cross-section of the sliding opening ensures more uniform surface pressure compared to a cylindrical surface, for example, and thus better load distribution. As a result, a lower coefficient of friction and thus a correspondingly weaker friction force can be verified. This effect can reduce wear and extend the service life of the plain bearing accordingly. Because the rail mounted in the plain bearing engages laterally, the rotational motion of the mounted rail is limited by the opening angle of the engaging opening, as described below, meaning that the rail can be mounted in the plain bearing with a degree of rotational play.

The sliding opening can have a rectangular cross-section. In this case, if the side surfaces are of different sizes, one of the larger side surfaces is preferably designed as the locating surface.

In a preferred embodiment, the sliding opening has a roughly square cross-section. Among other things, this design has the advantage that it easily permits the rail to be positioned in the plain bearing such that the rail is rotated by 90 degrees about the longitudinal axis.

The opening angle can be less than or equal to 90 degrees, preferably less than 70 degrees, and particularly preferably less than 50 degrees. When the rail is mounted in the plain bearing, the side flanks of the sliding opening serve as stops for limiting the rotational play of the rail in the plain bearing. The smaller the opening angle, the smaller the rotational play of the rail (depending on the structural dimensions of the rail). In this context, the side flanks can be inclined much more steeply towards the outside than is structurally required by the opening angle, which can increase the rotational play of the rail (depending on the geometrical dimensions of the rail). If the opening angle is reduced, the form of the bearing housing becomes more stable. Moreover, the risk can be reduced of dirt getting into the inside of the plain bearing through the engaging opening.

The plain bearing can display locking elements for locking the sliding element and preventing it from shifting axially in the through-opening. In this context, the locking elements can be designed as a projection and a groove, where the projection can be located around part and/or sections of the outside of the sliding element in the cross-sectional plane, extending radially. For locking, the projection positively engages the groove, which is provided around the inside wall of the through-opening and adapted to the projection, such that the sliding element is mounted in the through-opening in such a way that it can rotate, but not be displaced axially. Of course, the projection can alternatively be provided on the inside wall of the through-opening, and the groove on the outside of the sliding element.

The interior side surfaces of the sliding element can each be provided with at least one longitudinal groove running perpendicularly into the interior side surfaces. As a result, in order to insert the sliding element into the through-opening, the cross-section of the sliding element can be reduced by external pressure, such that it can easily be inserted into the through-opening. Furthermore, the longitudinal grooves reduce the friction surfaces between the interior-side surfaces and the rail head mounted in the plain bearing, which further reduces the friction forces. Moreover, the interior side surfaces segmented by the longitudinal groove can undergo elastic deformation more easily and thus adapt more easily to the shape of the inserted rail head. In addition, any abraded particles generated can be collected in the grooves. Furthermore, grooves can also be provided on the edges formed by the interior side surfaces of the sliding element. However, these grooves should preferably be of relatively shallow design. They can also serve to reduce friction, because increased friction can particularly occur at the edges between the interior side surfaces of the sliding element and the inserted rail head.

One of the sides opposite the engaging opening can expediently be provided as a mounting surface, with which the plain bearing contacts the component, where the mounting surface is essentially parallel to the longitudinal axis of the through-opening.

Furthermore, for the purpose of mounting, a mounting through-hole can be provided that runs past the through-opening and ends perpendicularly on the mounting surface. A screw, for example, can be inserted through the mounting through-hole and engage a thread, for example, provided in the component. To this end, the entry side for the screw on the side surface opposite the mounting surface is preferably counterbored, at least so far that the head of the screw does not project beyond the side surface. The mounting through-hole can be provided, at least in the end section facing the mounting surface, with an internal thread, the inside diameter of which is equal to the inside diameter of the remaining mounting through-hole. As a result, the screw can be inserted through the component and its external thread engage the internal thread. Alternatively, however, a screw with a smaller diameter can be inserted through the plain bearing and into an internal thread provided on or in the component. If the screw is to be inserted through the component in order to engage the internal thread, a mounting pocket bore running from the mounting surface into the bearing housing can be provided instead of a mounting through-hole. As a result, the side surface of the plain bearing facing away from the mounting surface can be of correspondingly plane design.

In order to prevent the mounting surface from rocking on the component, the mounting surface can be ground, for example. However, the mounting surface is preferably designed such that it displays raised surfaces that form a defined contact surface with the component. In this context, the contact surfaces should preferably be positioned around the mounting through-hole in order to obtain the most even contact possible between the mounting surface and the component, with no moment of force.

The bearing housing can be manufactured as a low-cost, die-cast zinc workpiece. Furthermore, the sliding element can be made of plastic, preferably as an injection molding. Plastic has the advantage of adapting more easily to any dimensional inaccuracies that may occur. Finally, the rail can be manufactured as an aluminum section, preferably as an anodized or hard-anodized aluminum section, particularly preferably as an anodized aluminum section. In this context, the material combination of plastic for the sliding element and aluminum for the rail is considered to be particularly preferable, because it can prove to be especially wear-resistant and quiet during operation.

The plain bearing according to the invention can be used in particular with a linear guide comprising a rail and, mounted on the rail in displaceable fashion, a plain bearing according to one of claims 1 to 10, or one of the embodiments described above. The rail can be provided with a rail head extending from a rail body and adapted to the sliding opening, and the rail can, by means of the rail head, engage the sliding opening through the engaging opening of the plain bearing.

In this context, for design as a movable bearing with linear play in a direction running in the cross-sectional plane, the sliding element can contact the rail head with a greater degree of play. To enable movement of the plain bearing along the rail with as little friction as possible, the sliding element should naturally contact the rail head with a correspondingly designed, small degree of play. However, under certain circumstances, the linear play is designed to be significantly greater than the play required for sliding. Due to the linear play, the sliding element and the rail head can move relative to one another in accordance with the magnitude of the linear play in the direction of the larger degree of play running in the cross-sectional plane. If the rail head has a rectangular cross-section, for example, the play can preferably be provided in the direction of two, opposite side surfaces. Consequently, the movable bearing that results can display linear play in one direction, or in a direction perpendicular thereto.

With the above design of the rail head with a rectangular or square cross-section, the sliding element can be designed to enclose the rail head at least partially on all sides to ensure a tight fit of the rail head in the sliding element. Thanks to the polygonal, rectangular or square cross-sections of the rail head and the sliding opening, the rail head is prevented from twisting in the sliding element, which is mounted in the through-opening of the bearing housing such that it can rotate, but not be displaced in the axial direction. In this context, the rotational motion of the sliding element in the through-opening is limited by the guide rail, which hits against the flanks on the inside of the engaging opening, and thus reduces the rotational motion of the sliding element to rotational play of the sliding element in the through-opening.

The rail body can have a side surface, which is designed as a contact surface for contacting and/or mounting the rail on a base, and which is perpendicular or parallel to the locating surface. In this context, two side surfaces of the sliding element, which delimit the sliding opening and are opposite one another, can preferably be parallel to the contact surface, and two side surfaces of the sliding element, which delimit the sliding opening and are opposite one another, can be perpendicular to the contact surface of the rail body. In other words, if the sliding opening has a square cross-section, the side surfaces of the sliding element that delimit the sliding opening are parallel or perpendicular to the locating surface of the rail body. In this way, favorable force distribution can be achieved, whereby the force introduced perpendicularly via the locating surface can be transmitted to the base perpendicularly to the locating surface of the rail body. The favorable force distribution is even maintained if the rail head is positioned in the sliding opening such that it is rotated by 90 degrees, as provided for in the invention.

For engaging in the engaging opening, the rail can be provided with a curved section, which is perpendicular to the longitudinal axis of the rail body and forms a rail neck with the rail head located on its end. This advantageously allows lateral engagement of the rail head in the plain bearing, meaning that a low overall design height can be achieved for the linear guide. In this context, the design height can be varied by changing the position of the plain bearing and the rail relative to one another by 90 degrees, as described above.

Furthermore, the rail body can have a rectangular cross-section with a larger side surface provided as a contact surface. Much as with the contact surface of the bearing housing, this design permits mounting, for example via bore holes perpendicular to the contact surface, through which screws are inserted to make a screw connection with the base. For better contact on the base, the contact surface can be ground, or display raised surfaces for defined contact between the contact surface and the base.

For the application described, two parallel rails and one carriage, mounted in displaceable fashion on the rails, can be provided, where the carriage can have several plain bearings connected to one another via a component, of which at least one is designed as a movable bearing. In this context, the linear play provided on the movable bearing is intended, for example, to compensate for parallelism or alignment errors in the rails, which can occur on account of assembly and/or operation. Similarly, the previously described rotational play, with which the rail is mounted in the plain bearing, can serve to compensate for parallelism or alignment errors. The component connecting the plain bearings can be designed as a flat or rectangular plate, for example.

The guide rails can be designed as a double guide rail with two guide rails connected firmly together. This enables factory-side pre-assembly of the linear guide, meaning that the guide rails require only little or no alignment at the site of use. To this end, the guide rails can be mounted via their respective contact surfaces on a common plate or the like. In another embodiment, the guide rails can be connected in one piece, where they are preferably connected at their free ends facing away from their respective rail heads. This prevents any possible displacement of the guide rail from its parallel position during operation.

The linear guide can be provided with two bearing blocks displaying parallel spacing, into which the ends of the guide rails are recessed and between which the carriage is arranged on the rails, and with a spindle, which is mounted in the bearing blocks in rotating fashion and can be driven manually. The spindle runs parallel to the rails and, in particular, essentially in the center between the rails, where the spindle passes through a drive opening with internal thread provided in the carriage, and engages this thread in order to drive the carriage on the rails.

In this context, the two rails, together with the bearing blocks running perpendicularly to the rails, form a rigid frame. Any parallelism errors occurring in the guide rails can, as described above, be compensated for by the rotational play of the rail heads in the plain bearings and by the provided movable bearings with linear play. In this context, one of two opposite plain bearings can be designed as a movable bearing. Thanks to the curved section of the rail, described in more detail above, and its lateral engagement in the plain bearing, the plain bearing can be positioned up to the lateral edge of the carriage. In comparison with a carriage extending beyond the plain bearings, this achieves favorable load transmission from the carriage to the plain bearings, combined with optimum support of any moments that occur.

Several practical examples of the present invention are described in greater detail below based on an associated drawing. The drawing shows the following.

Figure 1:
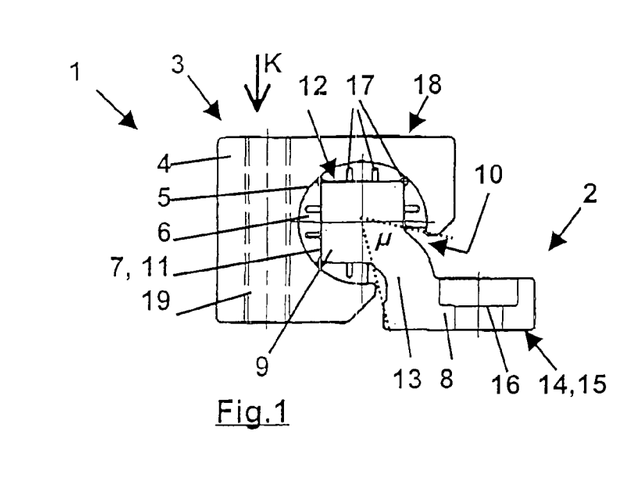
FIG. 1 A side view of a linear guide, with a plain bearing and a rail.
Figure 2:
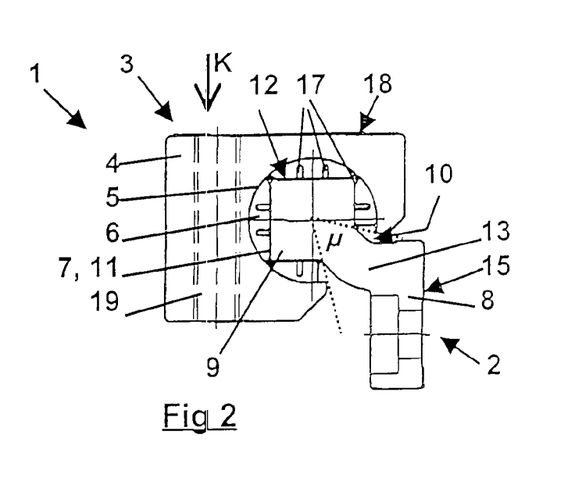
FIG. 2 A side view of the linear guide, where, compared to FIG. 1, the plain bearing and the rail are rotated by 90 degrees relative to one another, FIG. 3 A cross-sectional view of a second embodiment of the linear guide, with a modified plain bearing, FIG. 4 A side view of a third embodiment of the linear guide, with a plain bearing designed as a movable bearing, FIG. 5 Section A from FIG. 4, FIG. 6 A side view of a fourth embodiment of the linear guide, with a modified design of the plain bearing designed as a movable bearing, FIG. 7 Section B from FIG. 6, FIG. 8 A bottom view of the plain bearing shown in FIG. 1, FIG. 9 A top view of the plain bearing shown in FIG. 1, FIG. 10 A lateral front view of a fifth embodiment of the linear guide, FIG. 11 Section C from FIG. 10.
Figure 3:
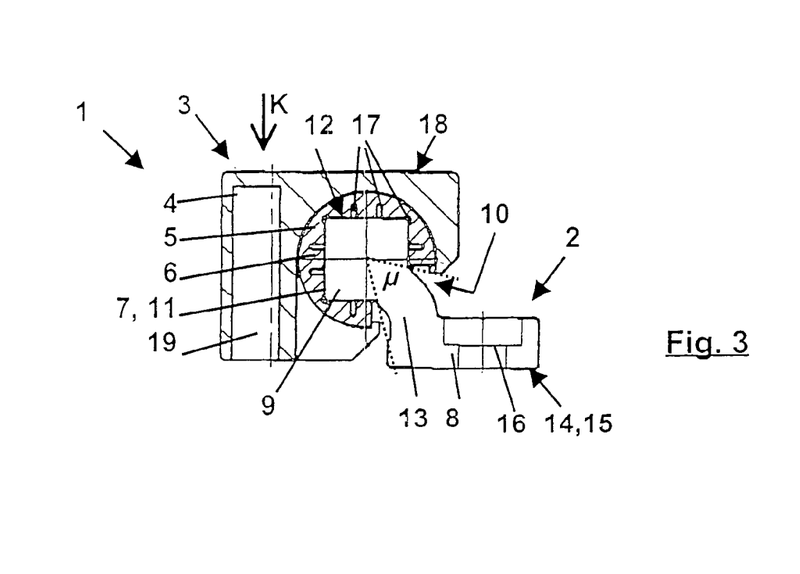

FIGS. 1 to 3 show side views or cross-sectional views of linear guide 1 with rail 2 and plain bearing 3, arranged in displaceable fashion on rail 2, where plain bearing 3 shown in FIGS. 1 and 2 is of somewhat different design than plain bearing 3 shown in FIG. 3.

Plain bearing 3 comprises a bearing housing 4 with a single, cylindrical through-opening 5 and a sliding element 6 supported in through-opening 5. Sliding element 6 delimits an interior sliding opening 7, which is coaxial to through-opening 5 and in which rail 2 is mounted in displaceable fashion by means of rail head 9, which extends from rail body 8 and is adapted to sliding opening 7. In this context, through-opening 5 and sliding opening 7 are laterally open towards the outside at an opening angle μ formed by engaging opening 10 extending along their entire axial length. Rail head 9 of rail 2 engages sliding opening 7 through engaging opening 10. Sliding opening 7 has an essentially square cross-section. In this context, two of the interior side surfaces 11 of sliding element 6, which delimit sliding opening 7, are designed as locating surfaces 12. Locating surfaces 12 are each essentially perpendicular to the greatest force K expected during operation, which is transmitted via sliding element 6 to rail head 8. Which of the two locating surfaces 12 ultimately absorbs this force K depends on the mounted position of the linear guide in a system that is not shown here in any further detail. In FIGS. 1 and 2, an operating mode is assumed in which force K is introduced perpendicularly into linear guide 1, meaning that interior side surface 11 positioned at the top in each case actually serves as locating surface 12.

In order to engage in engaging opening 10, rail 2 has a curved section, which runs in the image plane in the side views in FIGS. 1, 2, 3, 4, 6 and 10, and which forms rail neck 13 with rail head 9 located on its end. This allows lateral engagement in plain bearing 3, meaning that a low overall design height is achieved for linear guide 1. Furthermore, as shown in FIGS. 1 and 2, plain bearing 3 and rail 2 can take up two positions, one being rotated by 90 degrees relative to the other, meaning that rail body 8 can be mounted in a correspondingly offset position on a base (not shown), for example horizontally (FIG. 1) or vertically (FIG. 2). Rail body 8 has an essentially rectangular cross-section with a larger lateral surface 14, which is provided as a contact surface for connection to the base (not shown). For this purpose, several countersunk bores 16 are provided in the rail body, through which rail 2 can be firmly attached to the base (not shown) by means of a screw connection.

Opening angle μ, i.e. the angle between the imaginary lines running radially from the longitudinal axis of through-opening 5 to the respective side flank of engaging opening 10, is less than 70 degrees in this practical example. Although rail 2 is mounted in sliding opening 7 in displaceable fashion, it is connected in non-rotating fashion to sliding element 6 due to the square design of sliding opening 7. Due to its cylindrical outer surface, sliding element 6 is mounted in cylindrical through-opening 5 in rotating fashion. Therefore, the rail is mounted in the plain bearing such that it can slide in the longitudinal direction and rotate. However, because rail head 9 of rail 2 extends through through-opening 5 and into sliding opening 7, the side flanks of engaging opening 10 serve as stops limiting the rotational motion of rail head 9, meaning that the rotational motion of the rail is limited by the opening angle μ and thus reduced to rotational play. For linear guide 1 installed in a system not shown here, this rotational play can serve to compensate for guide and parallelism errors.

Figure 4:
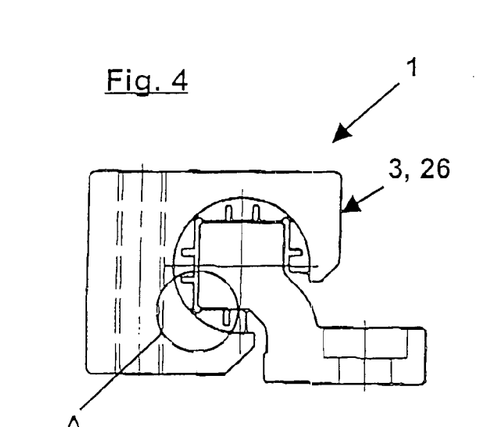
Figure 5:
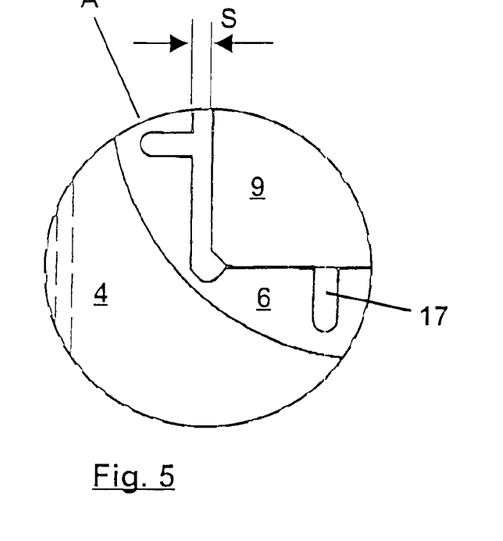
Figure 6:
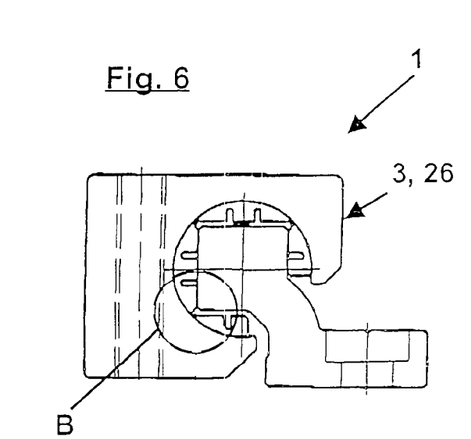
Figure 7:
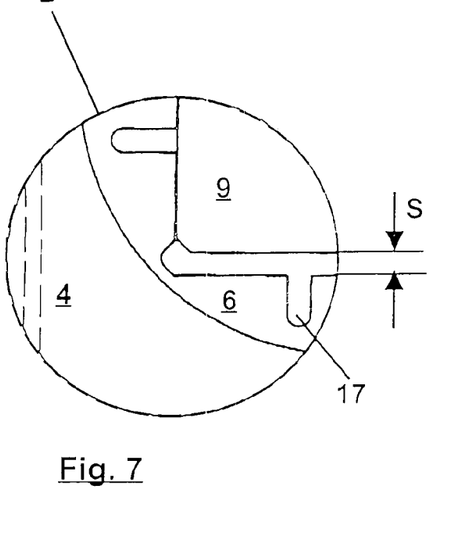

FIGS. 4 and 6 show two different linear guides 1 with different plain bearings 3. FIGS. 5 and 7 each show enlarged sections A and B from FIGS. 4 and 6, respectively. In this context, sliding elements 6 (as shown in FIGS. 1 to 3) are provided on their interior side surfaces 11 with longitudinal grooves 17 running perpendicularly into interior side surfaces 11. Longitudinal grooves 17 serve to reduce friction and to adapt the shape of sliding element 6 to rail head 9. Furthermore, shallow longitudinal grooves 17, which are likewise intended to reduce friction, are provided on the edges formed by interior side surfaces 11 of sliding element 6.

In contrast to sliding elements 6 shown in FIGS. 1 to 3, the sliding element in FIGS. 4 and 6 is positioned against the rail head with more play in the horizontal direction (FIG. 4) and the vertical direction (FIG. 6). Consequently, plain bearings 3 shown in FIGS. 4 and 6 are designed as movable bearings 26, each of which displays linear play S, which exists in the horizontal direction in the cross-sectional plane in FIG. 4 and in the vertical direction in FIG. 6. Naturally, in order to permit rail head 9 to slide in sliding opening 7, a degree of play also exists in principle between the contacting interior side surfaces 11 of sliding element 6 and rail head 9, where this play, however, is designed to be as small as possible to enable firm guidance, while linear play S described above is designed to be significantly greater. In addition, linear play S can compensate for parallelism and alignment errors of the linear guide.

Figure 8:
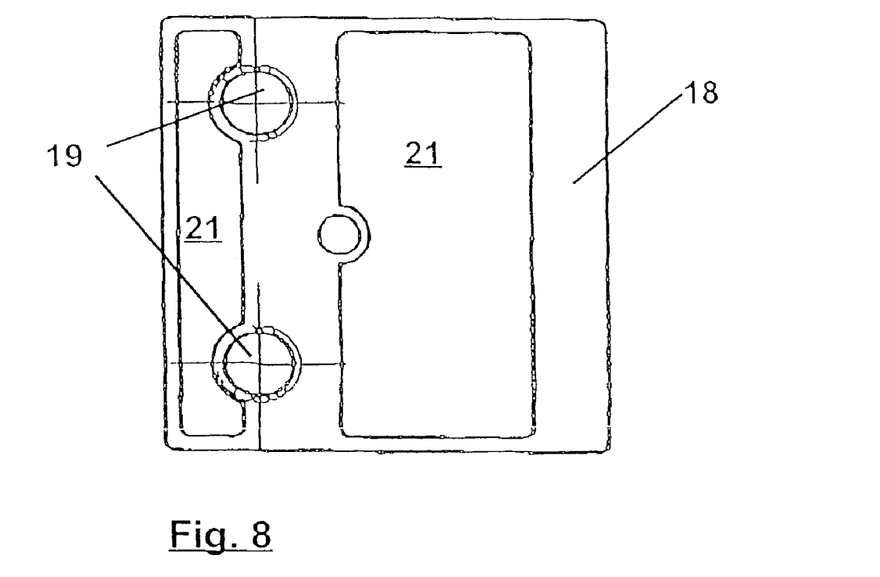
Figure 9:
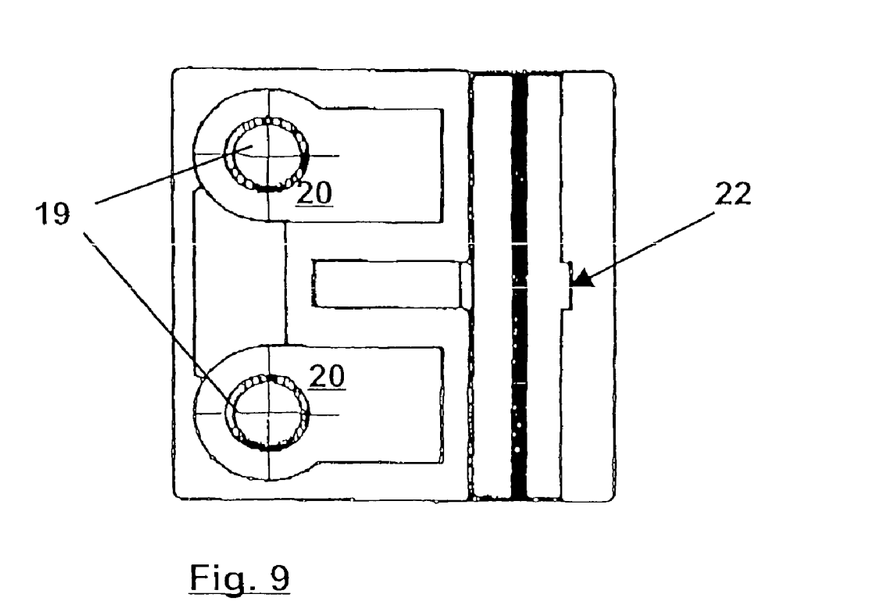

FIGS. 8 and 9 show a top and bottom view, respectively, of plain bearing 3 according to FIGS. 1 and 2. The top of the plain bearing is provided as mounting surface 18, via which plain bearing 3 contacts a component not shown here for the purpose of mounting. Perpendicular to mounting surface 18 are two mounting through-holes 19, which, as shown in FIGS. 1 and 2, run past through-opening 5. Mounting through-holes 19 are provided with an internal thread. As a result, plain bearing 3 can be screwed to a component not shown here, such that the screw (not shown) is inserted through the component and into mounting through-hole 19. In this context, it is advantageous that the total thickness of bearing housing 4 is available for the screw connection, so that a particularly stable screw connection can be achieved here. In another mounting option, a screw (not shown) with a smaller diameter can be inserted from plain bearing 3 into the component (not shown) and screwed tight there. The first option for the screw connection is advantageous when the component is relatively thin, the second when it is relatively thick. As shown in FIG. 9, the mounting through-holes lead into recessed areas 20 on the bottom of the plain bearing, in order to accept the screw head of the screw (not shown), such that the screw head does not project from the bottom of plain bearing 3. In contrast to the other illustrations, the mounting through-hole in FIG. 3 is shown in the form of a pocket bore, where the screw engages the pocket bore from the component to mount plain bearing 3.

As can be seen in FIG. 8, mounting surface 18 is provided with raised surfaces 21 to form a defined contact surface with the component (not shown in FIG. 8). These raised surfaces are positioned around mounting through-hole 19, which ends in mounting surface 18, in order to prevent plain bearing 3 from rocking on the component and thus enable firm mounting of plain bearing 3 on the component (not shown).

Furthermore, locking elements are provided to prevent sliding element 6 from shifting axially in through-opening 5, where the locking elements comprise a projection (not visible in the Figures) and a groove 22 (shown in FIG. 9). The locking elements run in the cross-sectional plane and positively engage one another, such that sliding element 6 is mounted in rotating fashion and any axial shifting of sliding element 6 is prevented.

Figures 10, 11:
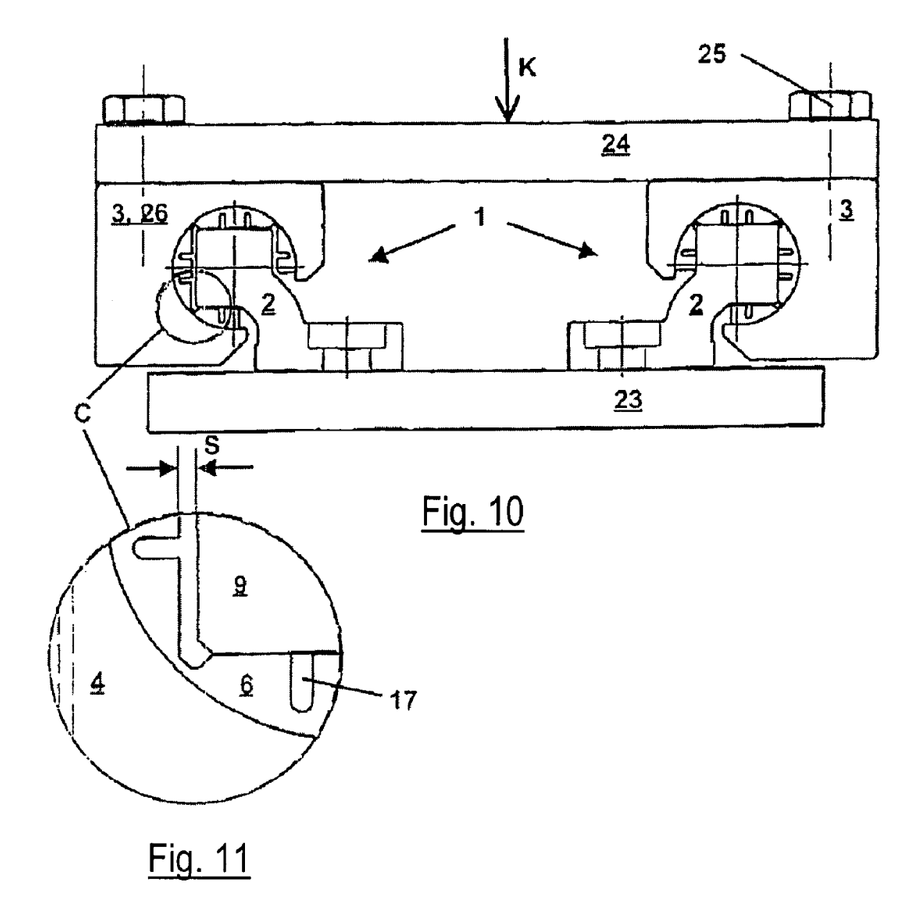

FIG. 10 shows a linear guide with two parallel rails 2, which are mounted on base 23 and mounted in displaceable fashion in two plain bearings 3, where the two plain bearings 3 are firmly connected to one another by a flat component 24 and screws 25. The left plain bearing 3 in FIG. 10 is designed as a movable bearing 26. This is illustrated clearly in FIG. 11, an enlargement of section C in FIG. 10, in which the linear play S provided is shown.

Thus, FIG. 10 shows a typical arrangement of a linear guide 1 with two parallel rails 2, where one of every two opposite plain bearings 3 is designed as a movable bearing 26 in order to compensate for parallelism errors in rails 2. In this context, it also becomes clear that base 23 and component 24 can vary in terms of their widths and lengths. It further becomes clear that, thanks to the curved section of rail 2, plain bearing 3 can be screwed laterally to component 24, meaning that the load/force can be favorably transmitted from component 24 to plain bearing 3, or to linear guide 1.

LIST OF REFERENCE NUMBERS

1 Linear guide
2 Rail
3 Plain bearing
4 Bearing housing
5 Through-opening
6 Sliding element
7 Sliding opening
8 Rail body
9 Rail head
10 Engaging opening
11 Interior side surface
12 Locating surface
13 Rail neck
14 Lateral surface
15 Contact surface
16 Countersunk bore
17 Longitudinal groove
18 Mounting surface
19 Mounting through-hole
20 Recessed area
21 Raised surface
22 Locking groove
23 Base
24 Component
25 Screw
26 Movable bearing
S Linear play
K Force
µ Opening angle

The invention claimed is:

1. Plain bearing for guiding a rail, with a bearing housing (4) displaying a single, cylindrical through-opening (5), and a sliding element (6) which is supported in the through-opening (5) and which at least partially delimits an interior sliding opening (7), which is positioned coaxially relative to the through-opening (5) and in which the rail (2), by means of a rail head (9) extending from a rail body (8) and adapted to the sliding opening (7), is mounted in displaceable fashion, where the through-opening (5) and the sliding opening (7) are laterally open towards the outside at an angle µ formed by an engaging opening (10) extending along their entire axial length, through which the rail head (9) of the rail (2) can engage the sliding opening (7), characterized in that the sliding opening (7) displays a polygonal cross-section, where at least one of the interior side surfaces (11) of the sliding element (6) that delimit the sliding opening (7) and are designed as locating surfaces is essentially perpendicular to the greatest force expected during operation and transmitted via the sliding element (6) to the rail head (9).

2. Plain bearing according to claim 1, characterized in that the sliding opening (7) has a rectangular cross-section.

3. Plain bearing according to claim 1 or 2, characterized in that the sliding opening (7) 35 has a roughly square cross-section.

4. Plain bearing according to one of claims 1 to 3, characterized in that the opening angle (µ) is less than 90°.

5. Plain bearing according to one of claims 1 to 4, characterized by locking elements for locking the sliding element (6) and preventing it from shifting axially in the through-opening (5), where the locking elements are designed as a projection and a groove (22) and the projection is located around part and/or sections of the outside of the sliding element (6) in the cross-sectional plane, extending radially, and where the projection positively engages the groove (22), which is provided around the inside wall of the through-opening (5) and adapted to the projection, such that it can rotate.

6. Plain bearing according to one of claims 1 to 5, characterized in that the interior side surfaces (11) of the sliding element (6) are each provided with at least one longitudinal groove (17) running perpendicularly into the interior side surfaces (11).

7. Plain bearing according to one of claims 1 to 6, characterized in that one of the side surfaces (14) opposite the engaging opening (10) is provided as a mounting surface (18), with which the plain bearing (3) contacts the component, where the mounting surface (18) is essentially parallel to the longitudinal axis of the through-opening (5).

8. Plain bearing according to claim 7, characterized in that at least one mounting through-hole (19) is provided that runs past the through-opening (5) and ends perpendicularly on the mounting surface (18).

9. Plain bearing according to claim 7 or 8, characterized in that the mounting through-hole (19) is provided, at least in the end section facing the mounting surface (18), with an internal thread, the inside diameter of which is equal to the inside diameter of the remaining mounting through-hole (19).

10. Plain bearing according to claim 8 or 9, characterized in that the mounting surface (18) displays raised surfaces (21) that form a defined contact surface with the component (24).

* * * * *

UNITED STATES PATENT AND TRADEMARK OFFICE
CERTIFICATE OF CORRECTION

PATENT NO. : 7,217,034 B2
APPLICATION NO. : 11/107322
DATED : May 15, 2007
INVENTOR(S) : Moshammer It is certified that error appears in the above-identified patent and that said Letters Patent is hereby corrected as shown below:

On the face page, in field (30), under "Foreign Application Priority Data", in column 1, line 1, delete "20 2004 016 094 U" and insert -- 20 2004 016 094.3 --, therefor.

On the face page, in "Primary Examiner", in column 2, line 1, delete "Footiand" and insert -- Footland --, therefor.

In column 8, line 38, in Claim 1, before "displaying" delete "(4)".

In column 8, line 38, in Claim 1, after "through-opening" delete "(5)".

In column 8, line 39, in Claim 1, after "element" delete "(6)".

In column 8, line 40, in Claim 1, after "opening" delete "(5)".

In column 8, line 41, in Claim 1, after "opening" delete "(7)".

In column 8, line 42, in Claim 1, after "through-opening" delete "(5)".

In column 8, line 42, in Claim 1, after "rail" delete "(2)".

In column 8, line 43, in Claim 1, after "head" delete "(9)".

In column 8, line 43, in Claim 1, after "body" delete "(8)".

In column 8, line 44, in Claim 1, after "sliding" delete "15".

In column 8, line 44, in Claim 1, after "opening" delete "(7)".

In column 8, line 45, in Claim 1, after "through-opening" delete "(5)".

In column 8, line 46, in Claim 1, after "opening" delete "(7)".

In column 8, line 47, in Claim 1, after "opening" delete "(10)".

In column 8, line 48, in Claim 1, after "head" delete "(9)".

In column 8, line 49, in Claim 1, before "can" delete "(2)".

In column 8, line 49, in Claim 1, after "opening" delete "(7)".

UNITED STATES PATENT AND TRADEMARK OFFICE
CERTIFICATE OF CORRECTION

PATENT NO.       : 7,217,034 B2
APPLICATION NO.  : 11/107322
DATED            : May 15, 2007
INVENTOR(S)      : Moshammer It is certified that error appears in the above-identified patent and that said Letters Patent is hereby corrected as shown below:

In column 8, line 50, in Claim 1, after "opening" delete "(7)".

In column 8, line 51, in Claim 1, after "surfaces" delete "(11)".

In column 8, line 52, in Claim 1, after "element" delete "(6)".

In column 8, line 52, in Claim 1, after "opening" delete "(7)".

In column 8, line 55, in Claim 1, after "element" delete "(6)".

In column 8, line 55, in Claim I, after "head" delete "(9)".

In column 8, line 57, in Claim 2, after "opening" delete "(7)".

In column 8, line 58, in Claim 3, after "Claim 1" delete "or 2".

In column 8, line 59, in Claim 3, after "opening" delete "(7)".

In column 8, line 59, in Claim 3, before "has" delete "35".

In column 8, line 61, in Claim 4, after "according to" delete "one of claims 1 to 3" and insert -- claim 1 --, therefor.

In column 8, line 63, in Claim 5, after "according to" delete "one of claims 1 to 4" and insert -- claim 1 --, therefor.

In column 8, line 65, in Claim 5, after "element" delete "(6)".

In column 8, line 66, in Claim 5, after "through-opening" delete "(5)".

In column 8, line 67, in Claim 5, after "groove" delete "(22)".

In column 9, line 2, in Claim 5, after "element" delete "(6)".

In column 9, line 4, in Claim 5, after "groove" delete "(22)".

In column 9, line 5, in Claim 5, after "through-opening" delete "(5)".

In column 9, line 7, in Claim 6, after "according to" delete "one of claims 1 to 5" and insert -- claim 1 --, therefor.

UNITED STATES PATENT AND TRADEMARK OFFICE
CERTIFICATE OF CORRECTION

PATENT NO.         : 7,217,034 B2                                    Page 3 of 4
APPLICATION NO. : 11/107322
DATED              : May 15, 2007
INVENTOR(S)        : Moshammer It is certified that error appears in the above-identified patent and that said Letters Patent is hereby corrected as shown below:

In column 9, line 8, in Claim 6, after "surfaces" delete "(11)".

In column 9, line 9, in Claim 6, after "element" delete "(6)".

In column 9, line 10, in Claim 6, after "groove" delete "(17)".

In column 9, line 11, in Claim 6, after "surfaces" delete "(11)".

In column 9, line 12, in Claim 7, after "according to" delete "one of claims 1 to 6" and insert -- claim 1 --, therefor.

In column 9, line 13, in Claim 7, after "surfaces" delete "(14)".

In column 9, line 14, in Claim 7, after "opening" delete "(10)".

In column 9, line 15, in Claim 7, before ", with" delete "(18)".

In column 9, line 15, in Claim 7, after "bearing" delete "(3)".

In column 9, line 16, in Claim 7, after "surface" delete "(18)".

In column 9, line 17, in Claim 7, after "through-opening" delete "(5)".

In column 10, line 2, in Claim 8, after "through-hole" delete "(19)".

In column 10, line 3, in Claim 8, after "through-opening" delete "(5)".

In column 10, line 4, in Claim 8, alter "surface" delete "(18)".

In column 10, line 5, in Claim 9, after "claim 7" delete "or 8".

In column 10, line 6, in Claim 9, after "through-hole" delete "(19)".

In column 10, line 7, in Claim 9, after "surface" delete "(18)".

In column 10, line 10, in Claim 9, delete "(19)".

In column 10, line 11, in Claim 10, after "claim 8" delete "or 9".

In column 10, line 12, in Claim 10, after "surface" delete "(18)".

UNITED STATES PATENT AND TRADEMARK OFFICE
CERTIFICATE OF CORRECTION

PATENT NO.        : 7,217,034 B2
APPLICATION NO. : 11/107322
DATED             : May 15, 2007
INVENTOR(S)       : Moshammer

It is certified that error appears in the above-identified patent and that said Letters Patent is hereby corrected as shown below:

In column 10, line 13, in Claim 10, before "that" delete "(21)".

In column 10, line 14, in Claim 10, delete "(24)".

Signed and Sealed this

Twenty-first Day of August, 2007

JON W. DUDAS
*Director of the United States Patent and Trademark Office*